United States Patent [19]
Folmer

[11] Patent Number: 5,445,310
[45] Date of Patent: Aug. 29, 1995

[54] METHOD FOR SHEET METAL AND THERMOPLASTIC ADHESIVE BONDED ASSEMBLIES AND BRAZED BONDED ASSEMBLIES IN 360° SHAPES

[76] Inventor: Carroll W. Folmer, 29781 Pebble Beach Dr., Sun City, Calif. 92586

[21] Appl. No.: 95,108

[22] Filed: Jul. 21, 1993

[51] Int. Cl.⁶ .................... B23K 37/04; B23K 20/00; B23K 101/02; B32B 31/12
[52] U.S. Cl. ................. 228/173.6; 228/181; 228/235.1; 156/245; 156/382
[58] Field of Search ........... 228/44.3, 193, 235.1, 228/173.6, 181; 156/245, 232, 382

[56] References Cited
U.S. PATENT DOCUMENTS

| | | | |
|---|---|---|---|
| 2,416,137 | 11/1943 | Auxier | 156/382 |
| 3,025,208 | 8/1957 | Geiger | 156/382 |
| 3,072,225 | 4/1958 | Cremer | 156/382 |
| 3,996,019 | 12/1976 | Cogan | 228/193 X |
| 4,053,667 | 10/1977 | Smith | 156/245 X |
| 4,263,375 | 4/1981 | Elrod | 228/193 X |
| 4,489,276 | 12/1989 | Cadwell et al. | 228/235.1 X |
| 4,946,526 | 8/1990 | Petty-Galis et al. | 156/245 X |
| 5,242,102 | 9/1993 | Nicolas | 228/235.1 X |

Primary Examiner—Kenneth J. Ramsey

[57] ABSTRACT

A method for Sheet Meta) and Thermoplastic Adhesive Bonded Assemblies and Brazed Bonded Assemblies in 360° Shapes.

Abstract: A method for preparing and bonding Sheet Metal Adhesive Bond Shapes and Thermoplastic Bond Shapes and Brazed Bonded Shapes utilizing forming dies as bond tools and using the sheet metal inner shape as a pressure vessel for effecting an adhesive or brazed bond.

5 Claims, 18 Drawing Sheets

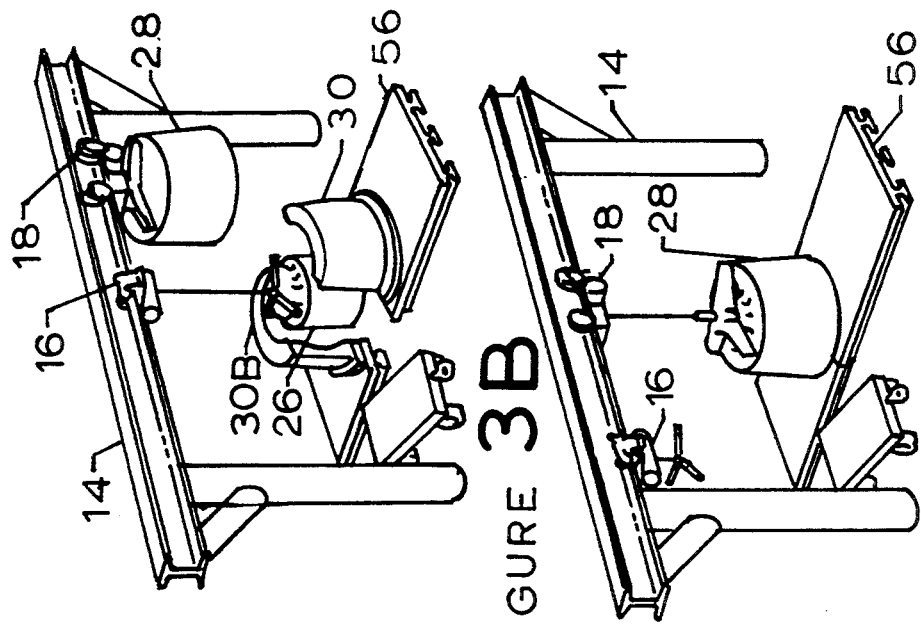
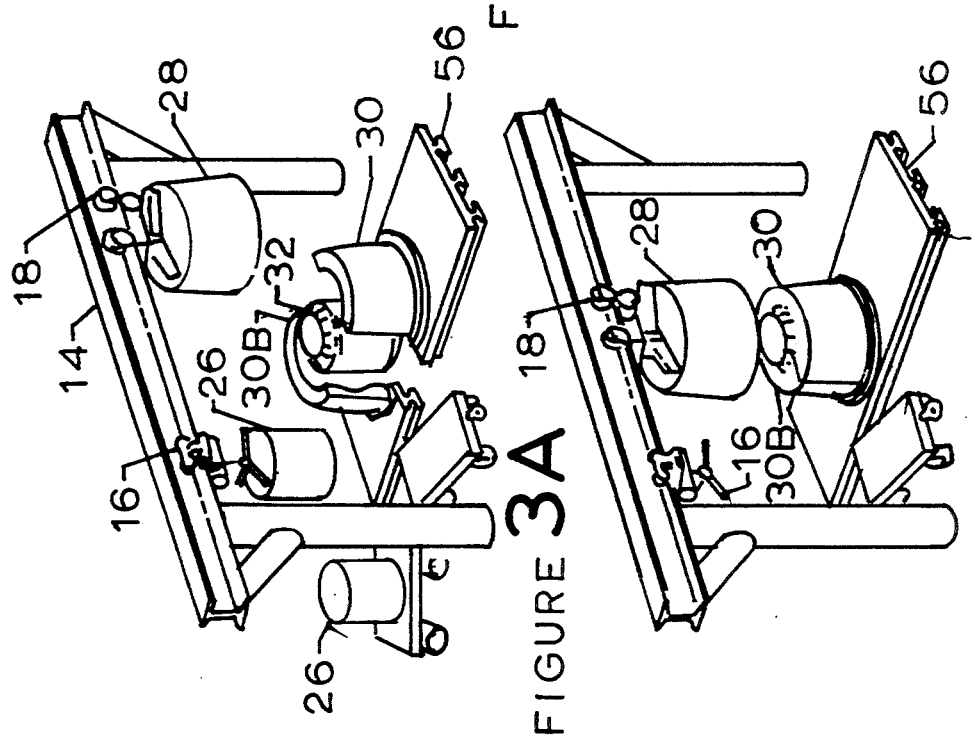

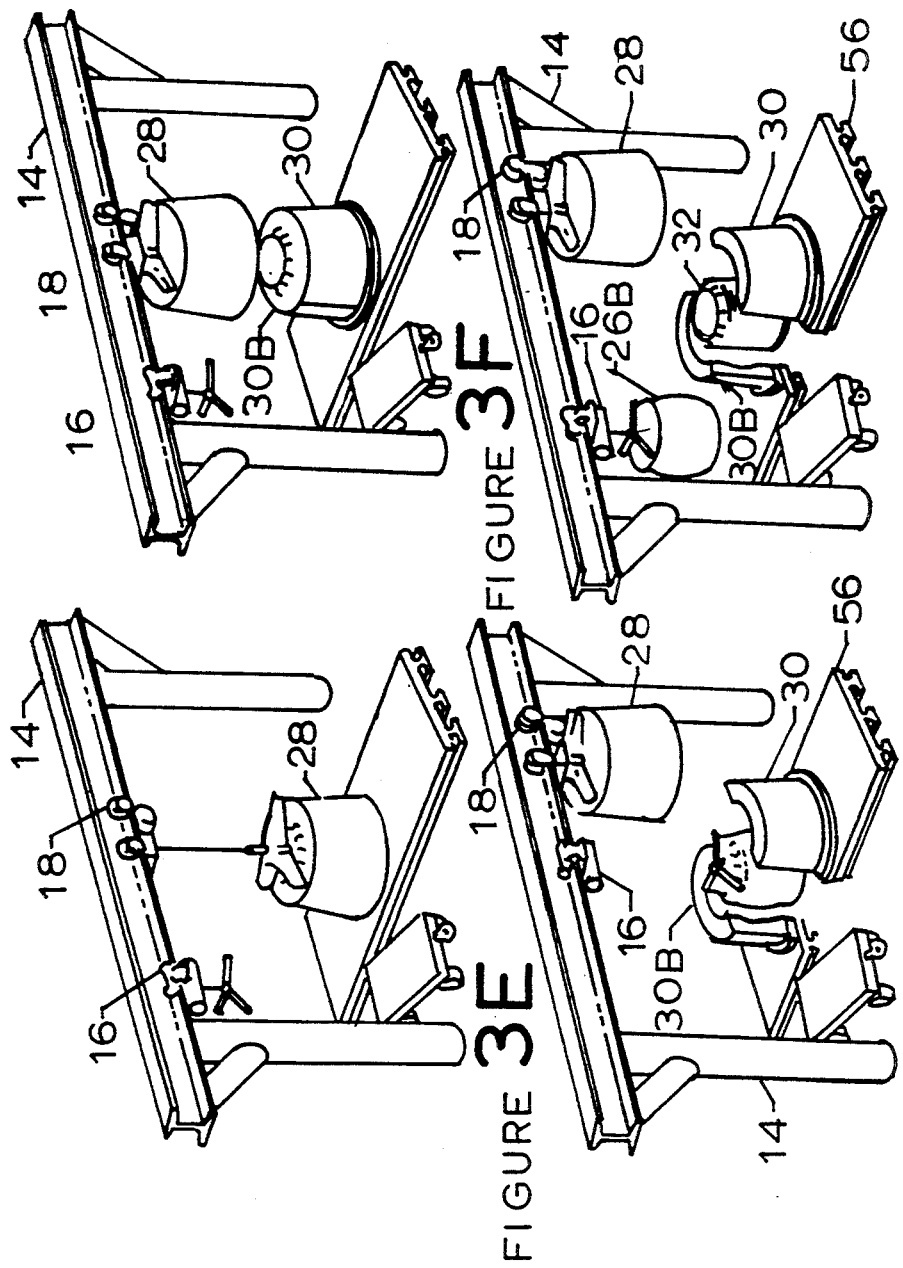

METHOD FOR SHEET METAL AND THERMOPLASTIC ADHESIVE BONDED ASSEMBLIES AND BRAZED BONDED ASSEMBLIES IN 360° SHAPES

BACKGROUND—CROSS-REFERENCES TO RELATED APPLICATIONS

This invention is related to my copending patent application "A METHOD OF HEAT ASSISTED SHEET METAL FORMING IN 360 DEGREE SHAPES, Ser. No. 95,109, filed concurrently."This application is also related to my copending application, Ser. No. 95,656, filed concurrently and entitled A METHOD FOR FORMING DETAILS AND ADHESIVE BONDING OF SHEET METAL AND COMPOSITE ASSEMBLIES.

2. BACKGROUND—FIELD OF INVENTION

This invention relates to the bonding of shapes for the aerospace and related industries.

2. BACKGROUND—DESCRIPTION OF PRIOR ART

There are factories and subcontractors who produce Bond Assemblies, usually in autoclaves. They have established a history of success in preparing for and producing Sheet Metal Bond Assemblies in autoclaves.

Although they have established a successful history, bonding in an autoclave suffers from a number of disadvantages:

(a) Sheet metal parts of a bond assembly must be placed in or on bond assembly tooling. Bond tools are very expensive.

(b) Adhesive bond assembly details must be bagged and sealed with the tooling in order to pull a vacuum to insure that the bond assembly is pressurized. This is expensive, recurring material cost and requires hand labor.

(c) After placing the bond assembly in the autoclave, it can take a considerable amount of time for the autoclave to come up to temperature resulting in expensive high energy consumption.

(d) It is very difficult to assure an even distribution of temperature within the autoclave and quite often large fans are used to stir the air in an effort to attain said distribution.

(e) Since adhesive bond efficiencies demand that several assemblies be bonded at the same time in an autoclave, it is sometimes necessary to wait until the conditions necessary to bond are met. An example would be if you want a bond cycle of 350° F. at 35 psi and the next cycle is 250° at 70 psi.

(f) Autoclave time must be scheduled.

U.S. Pat. No. 2,416,137 of Auxier and 3,025,208 of Geiger reflect bag molding and an apparatus for adhesive bonding but are very expensive methods of manufacture. My invention deletes-the expense of sealing and bagging for an autoclave.

U.S. Pat. No. 3,072,225 of Cremer on brazed honeycomb sandwich structure is an excellent treatise on brazing. My patent addresses those instances where the inner skin with integral edge closures can be used as the pressure vessel for bonding. The edge closures require attention. See FIG. 18

The lightest possible structures can be bonded in this facility covering a spectrum of temperature from 250° Farenheit to 2000° Farenheit.

OBJECTS AND ADVANTAGES

Accordingly, besides the objects and advantages of the bonding method described in my patent, several objects and advantages of the present invention are:

(a) by using the inner detail as a pressure vessel adhesive bond assemblies, brazed bond assemblies, and other high temperature bond assemblies can be produced in the same facility by adjusting temperature, pressure, and time as appropriate.

(b) to provide controlled heat in a timely manner as the heat source is advantageously located and requires much less energy than the amount used in current facilities.

(c) to avoid the excessive cost of bagging and sealing adhesive bond assemblies for an autoclave as the inner skin is the pressure vessel.

(d) to use the same dies used to form sheet metal or thermoplastic details as bond tools, to insure fit up and eliminate expense of bond tooling.

(e) perforated sheet metal and thermoplastic details can be bonded using the same slave sheet used to form the details. The slave sheet becomes the pressure vessel.

(f) to avoid excessive parts as edge members are incorporated into skins and result in lowest cost and weight.

(g) the facility has incorporated the ability to pull a vacuum on the die side and to use argon on the heater side for bonding in a superclean atmosphere if required.

DRAWING FIGURES

As noted earlier this system uses the same facility used in the patent application" A METHOD OF HEAT ASSISTED SHEET METAL FORMING IN 360 DEGREE SHAPES. FIGS. 1 through 12 are schematic and are intended to present an overview of the forming methods. Dies are currently planned as singular, dual and triple. FIGS. 13 through 20 are intended to define the bonding process.

FIG. 1 shows an overall view of the hot forming, bonding facility.

FIG. 2 shows the triple die configuration translated and shows a rotatable quencher used in hardening of metals.

FIGS. 3A–3H show the operation sequences for the dual die configuration which will be the most common application.

FIGS. 4A and 4B show the hot vacuum forming sequence.

FIG. 5 shows a roll planish weld.

FIGS. 6A and 6B show the before and after shape of a 360 sheet metal shape.

FIG. 7 shows a composite view of a typical sheet metal shape inside the facility.

FIG. 8 shows a section cut through the sheet metal shape and facility.

FIG. 9 shows an enlargement near the upper end of the sheet metal shape.

FIG. 10 shows an enlargement near the lower end of the sheet metal shape.

FIG. 11 shows a slave sheet being used to form perforated metal shapes.

FIG. 12 is similar to FIG. 7 except it defines an adhesive bonded shape using the inner skin as a pressure vessel for bonding.

FIG. 13 is similar to FIG. 8 except it is a section cut through an adhesive bond shape and the facility using the inner skin as a pressure vessel for bonding.

FIG. 14 is similar to FIG. 9 except it shows an enlargement near the upper end of an adhesive bond shape using the inner skin as a pressure vessel for bonding.

FIG. 15 is similar to FIG. 10 except it shows an enlargement near the lower end of an adhesive bond shape using an inner skin as a pressure vessel for bonding.

FIG. 16 is simialr to FIGS. 14 and 15 except it depicts a slave sheet used as a pressure vessel for bonding.

FIG. 17, 18, and 19 define alternate edge treatments.

REFERENCE NUMERALS IN DRAWINGS
14 Overhead Transfer Beam
16 Part loading Winch
18 Case and Die Winch
20 Controller and Recorder
22 Hydraulic Triple Die Positioning Base
24 Heater Bank Mount Ring
26 Preform
26B Formed Shape of Outer Skin From 26
26C Formed Shape of Inner Skin From 26
28 Case
30 Die
30B Die Similar to 30
32 Multi-Purpose Holder
34 Heating Elements
36 Upper Inflatable Impingement Seal
38 Lower Inflatable Impingement Seal
40 Upper Seal Retainer
42 Lower Seal and Part Retainer
44 Upper Seal, Case to Holder
46 Lower Seal, Holder to Base
48 Lower Seal, Case to Base
50 Forming Pressure Tube
52 Upper Seal Pressure Tube
54 Lower Seal Pressure Tube
56 Hydraulic Dual Die Positioning Base
58 Perforated Sheet Metal Part
58B Perforated Sheet Metal Part After Forming
60 Core- Main Body
60B Dense Core-Upper End
60C Dense Core-Lower End
60D Dense Core-Brazed Bond
62 Bond Die Heating Element
64 Thermoplastic Detail
64B Thermoplastic Detail After Forming
66 Base
68 Septum-Brazed Bond
70 Caul Plate

DESCRIPTION OF DRAWINGS

FIGS. 1 through 11 are schematic and are intended to present an overview of the forming methods. Dies are currently planed as singular, dual and triple. Some details depicted such as seals for pulling a vacuum, are not required for bonding, but the intention is to use the forming facility, as is, for bonding. FIGS. 1 through 11 are described in detail in the patent application, Ser. No. 95,109, "A METHOD OF HEAT ASSISTED SHEET METAL FORMING IN 360 DEGREE SHAPES".

FIG. 1 shows an overall view of the hot forming facility with hydraulic positioning bases 22 for three dies to provide horizontal movement of the dies. The bases 22 index to a heater core holder mounting 24. Three dies offer an ability to remove parts that would be trapped on a single die or a dual die. Winches mounted to an overhead frame 14 provide vertical movement. One winch 16 is for parts and lightweight duty. The second winch 18 is for heavy cases and dies. The controller recorder 20 controls the application of heat, pressure, and cooling over time.

FIG. 2 is a view looking down on the triple hydraulic positioning bases 22 and dies 30, 30B, and 30C after translation. A quencher 62 is shown rotated from its stowed position at the top of the figure to a position directly above the sheet metal shape 26B and heater core 32.

FIGS. 3A-3D show the operation sequence for the dual die configuration which will be the most common application. A 360 degree preform 26 is lifted from a cart by the: part winch 16 and placed over the heater core holder 32. See FIG. 8 for a depiction of a preform being prepared. The dies 30 and 30B are translated into position, using the hydraulic dual die positioning base 56, and the case 28 is placed over the dies by the heavy duty winch 18. The case fits firmly to the dies as it resists the forming gas pressure. If forming titanium, a vacuum is pulled on the outside of the case or die side of the preform and gas pressure, usually argon, is then applied to the heater core holder side of the preform. See FIG. 6 for a depiction of the relationship of vacuum and argon. If using a metal that is not contaminate sensitive the vacuum/argon system is not required.

FIGS. 3E-3H are a continuation of the dual die forming and removal sequence. Gas pressure will force the heated preform 26 to elongate and take the shape of the dies. The case 28 is removed. The dies 30 and 30B are translated away from the part. The part 26B is then removed. The operation noted assumes parts used in the annealed condition. Hardened parts will require additional operation.

FIG. 5 shows a roll planish weld.

FIG. 6A and 6B show a before shape 26 and after shape 26B of a 360 degree sheet metal shape.

FIG. 7 shows a composite view of a typical sheet metal shape 26B inside the facility. The sheet metal shape is shown in the before 26 and after forming 26B shapes. The composite view shows that the case 28 is sealed with 44 to the heater core holder 32 and to the base plate 56 with seal 48. The heater core 32 is sealed to the baseplate 56 with seal 46. This allows a vacuum to be pulled on the outside of the part. Gas pressure inflates the end seals 36 and 38. Gas forming pressure, argon, if forming titanium for contaminate control, can be applied to the preform 26 forcing it to take the shape of the die 30. This same facility can and will be used for annealing and hardening of materials.

FIG. 8 shows a section cut through the shape. It illustrates that the dies 30 are translated away from the part 26B, for part 26B removal, of heating and cooling during hardening.

FIG. 9 shows an enlargement of the upper end of the shape 26B and preform 26. It illustrates the case 28 is sealed to the heater core holder 32 by compressing a seal 44. It illustrates that the inflatable impingement seal 36 is pressurized with gas through a delivery tube 52.

The impingement seal is retained with step-pins 40. With the ends sealed and the heater 34 activated, gas pressure is applied to the preform 26 and results in the finished shape 26B taking the shape of the die 30.

Figure 1:
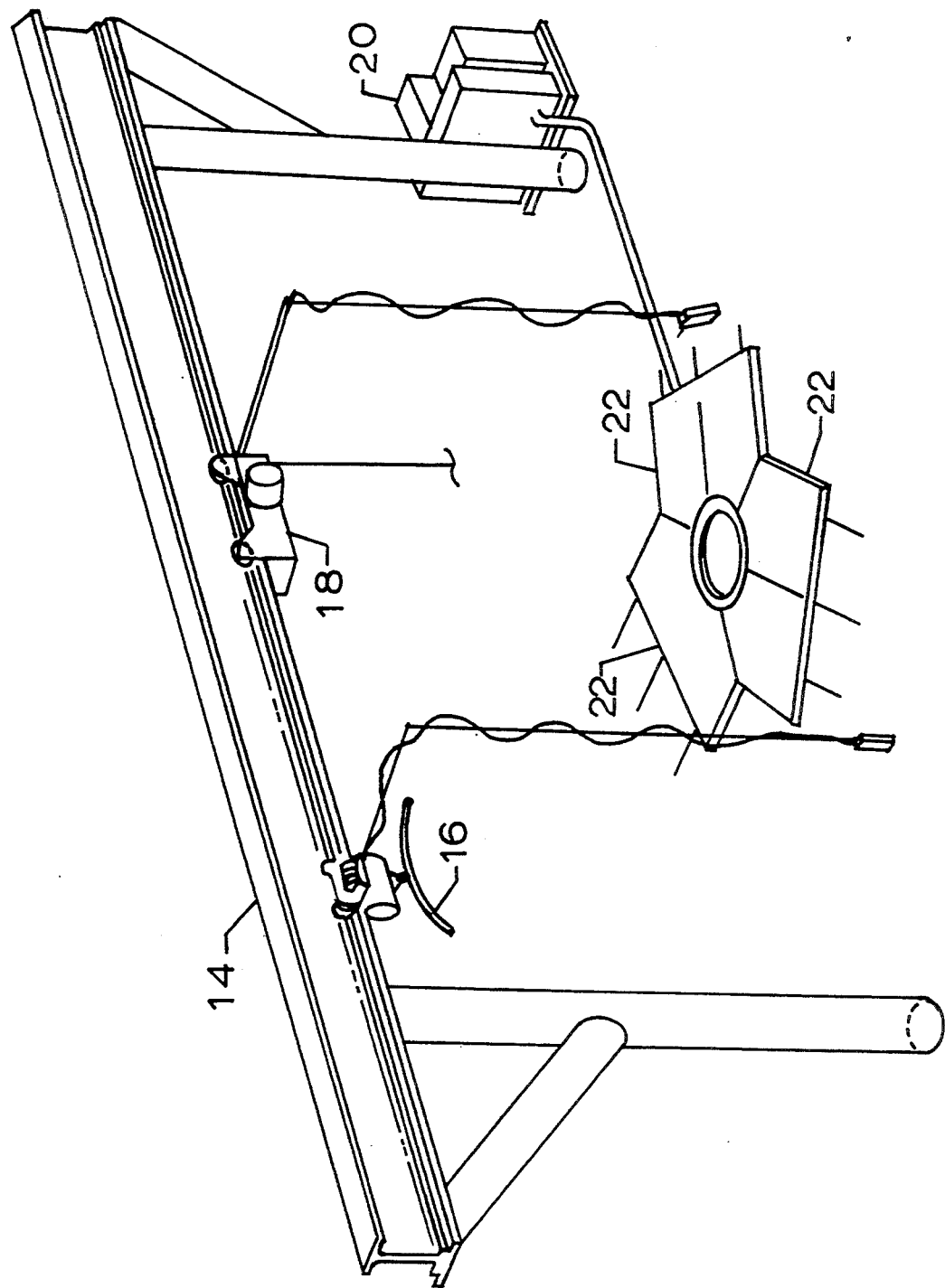
Figure 2:
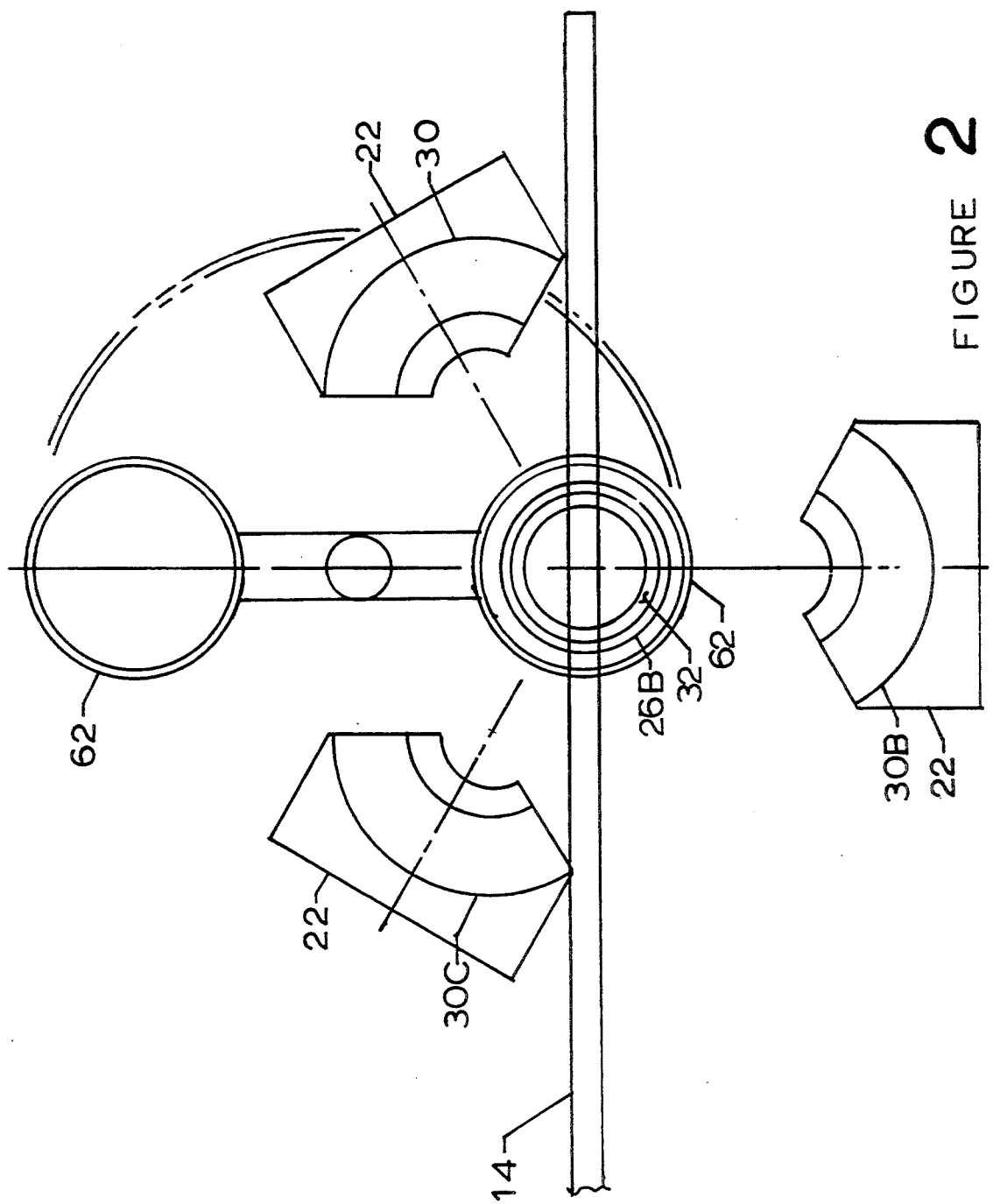
Figure 4B:
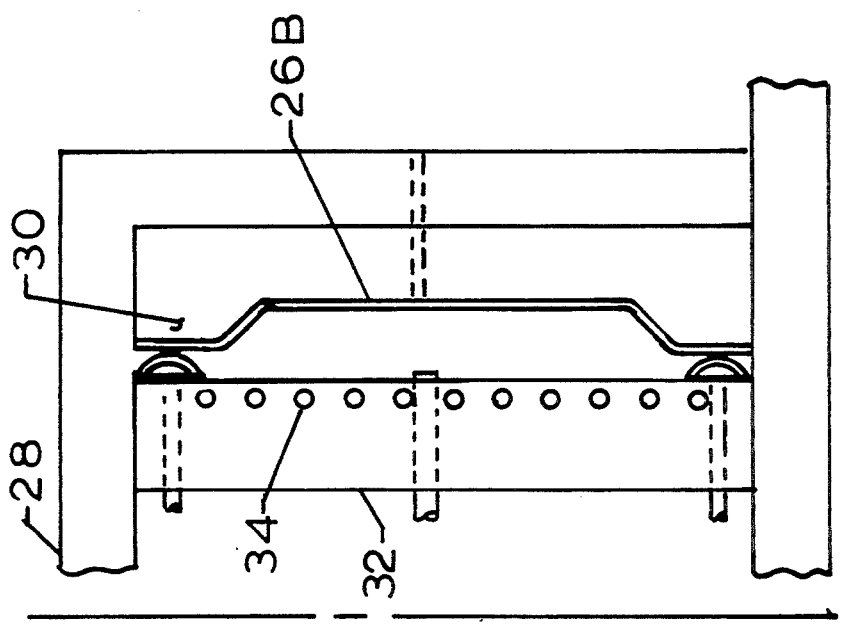
FIGS. 4A and 4B are schematics that is a schematic to illustrate the relationship of vacuum and argon especially with titaniums which are very sensitive to contaminates. This is an illustration of the Beta 21-S titanium operation. The importance of the vacuum and argon can not be overstated as it provides a practical cost effective clean atmosphere.
Figure 4A:
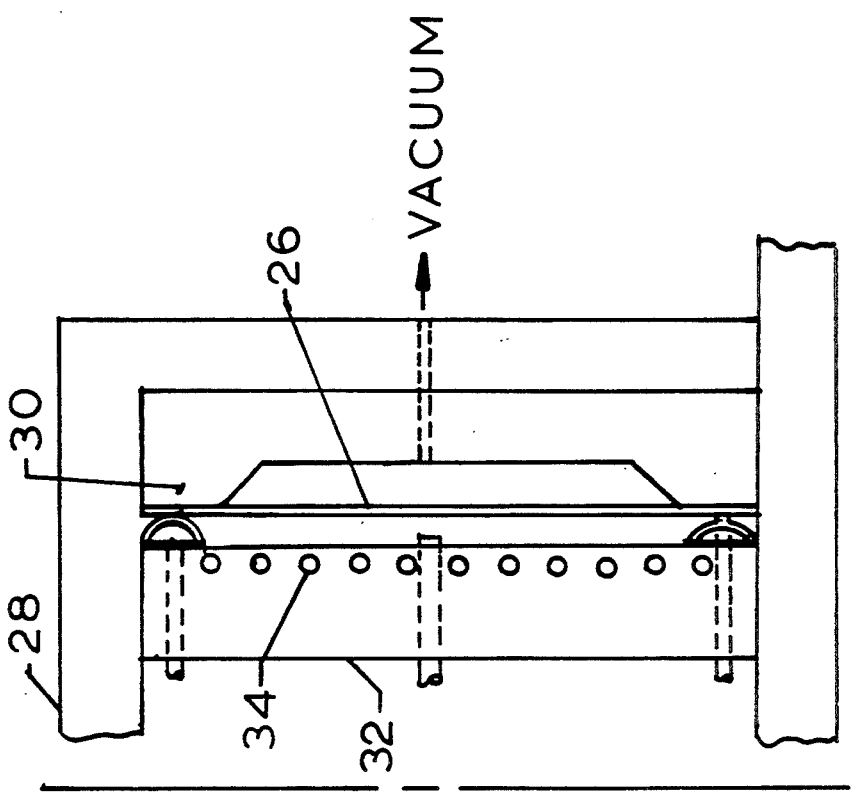
Figure 5:
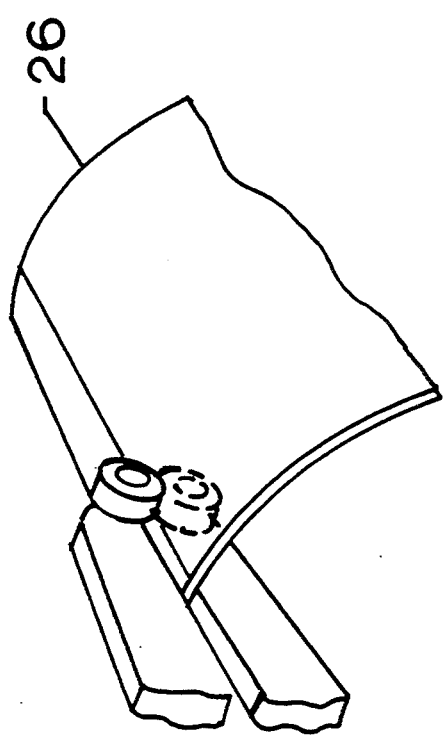
Figure 6:
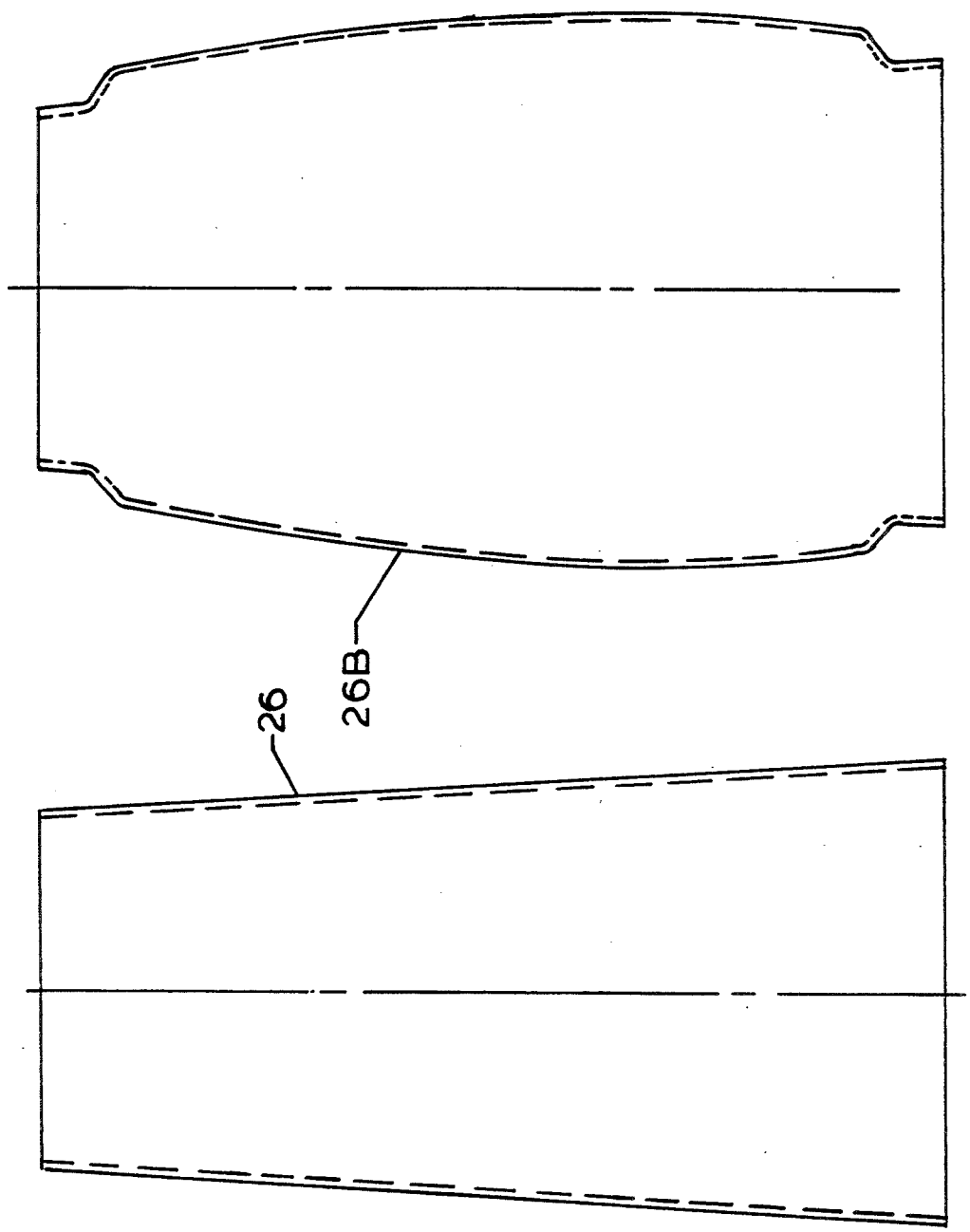
Figure 7:
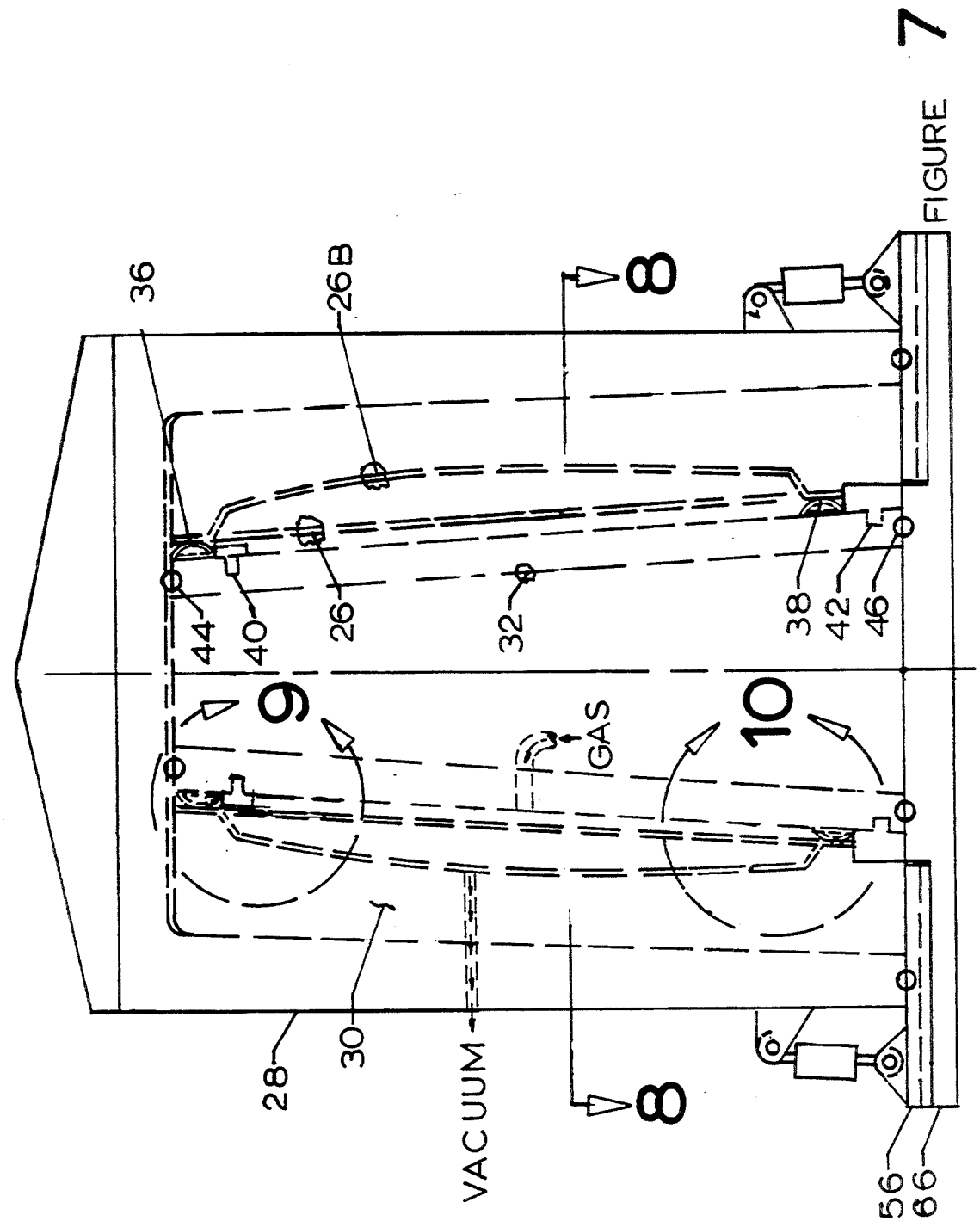
Figure 8:
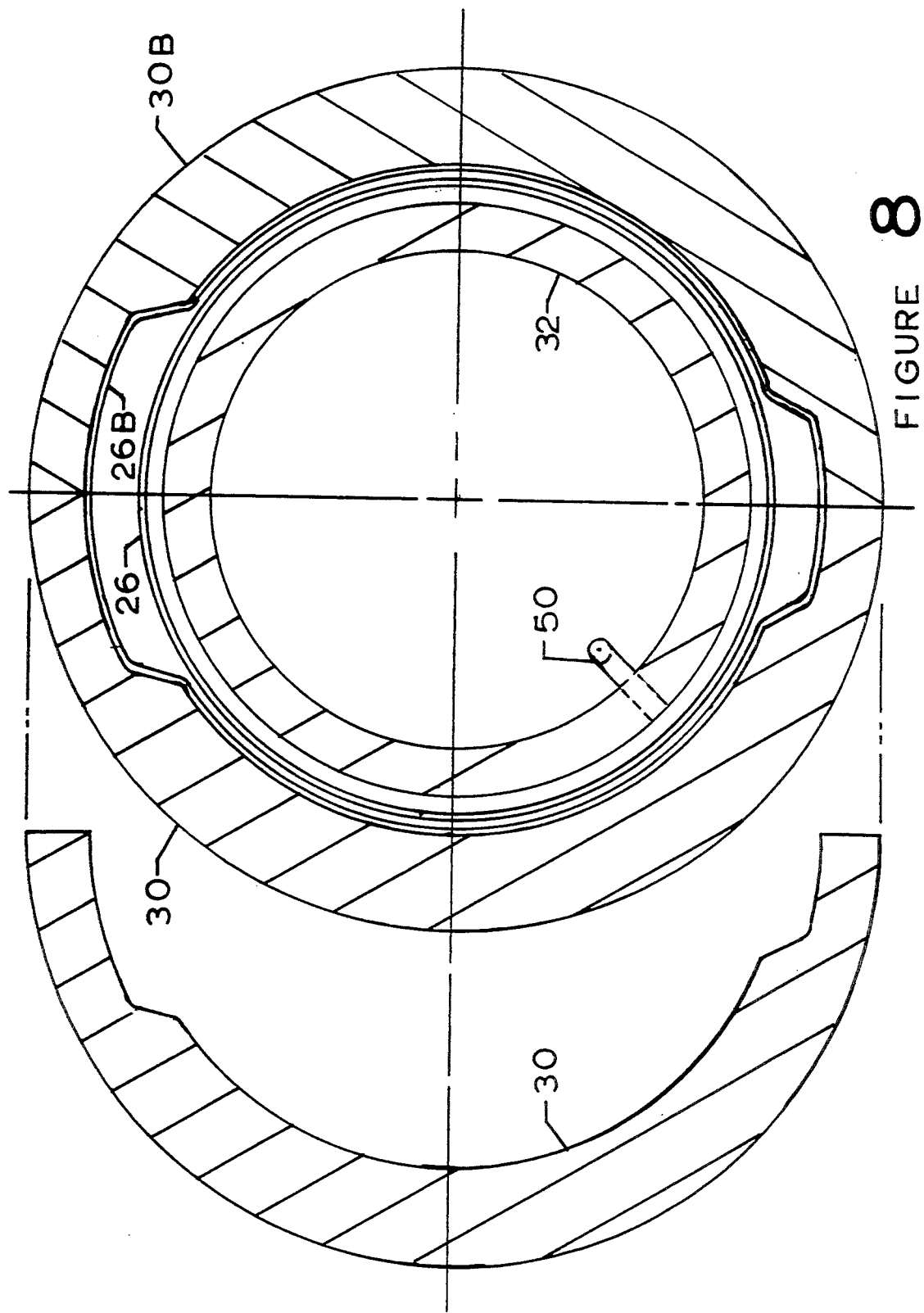
Figure 9:
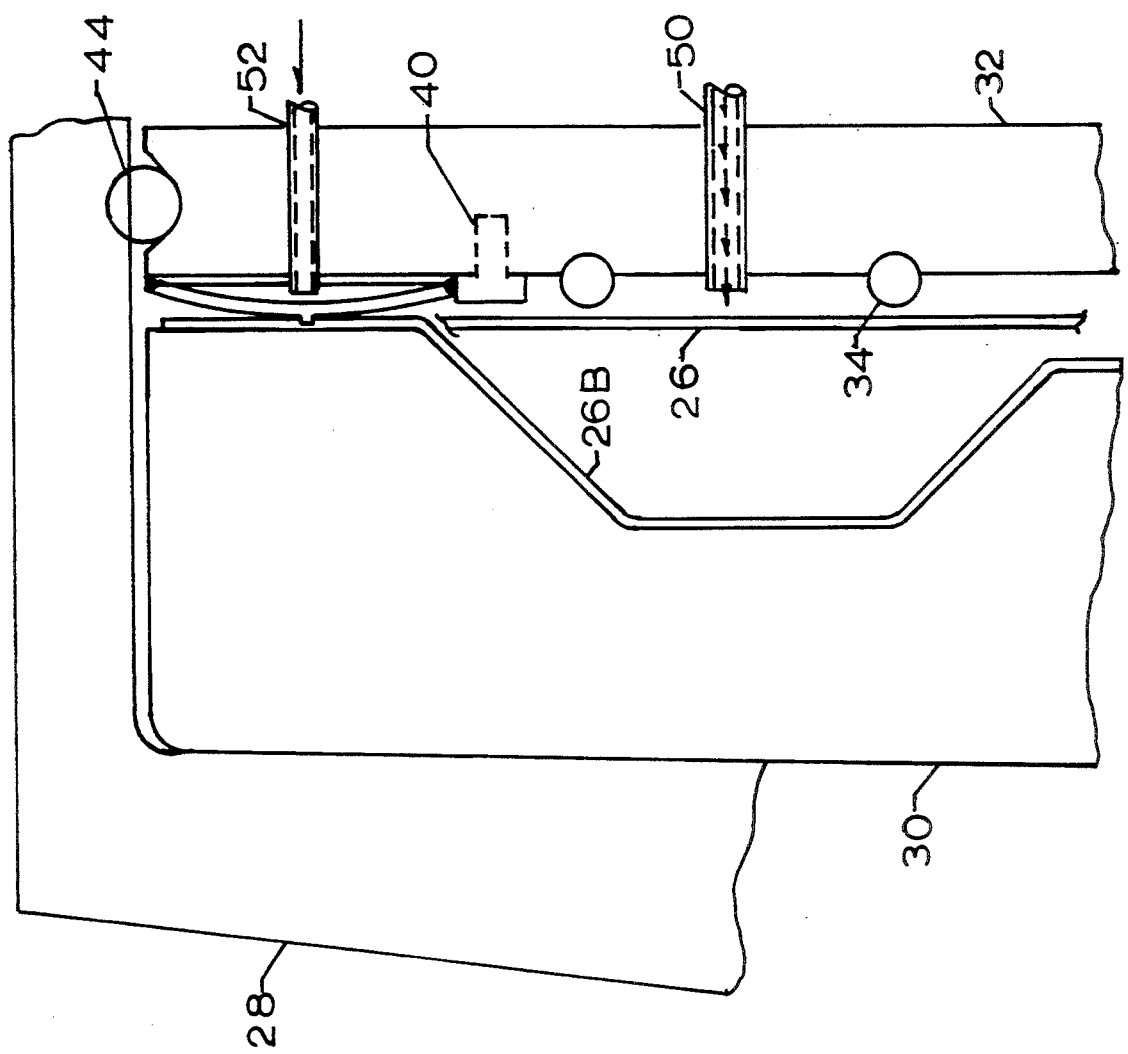
Figure 10:
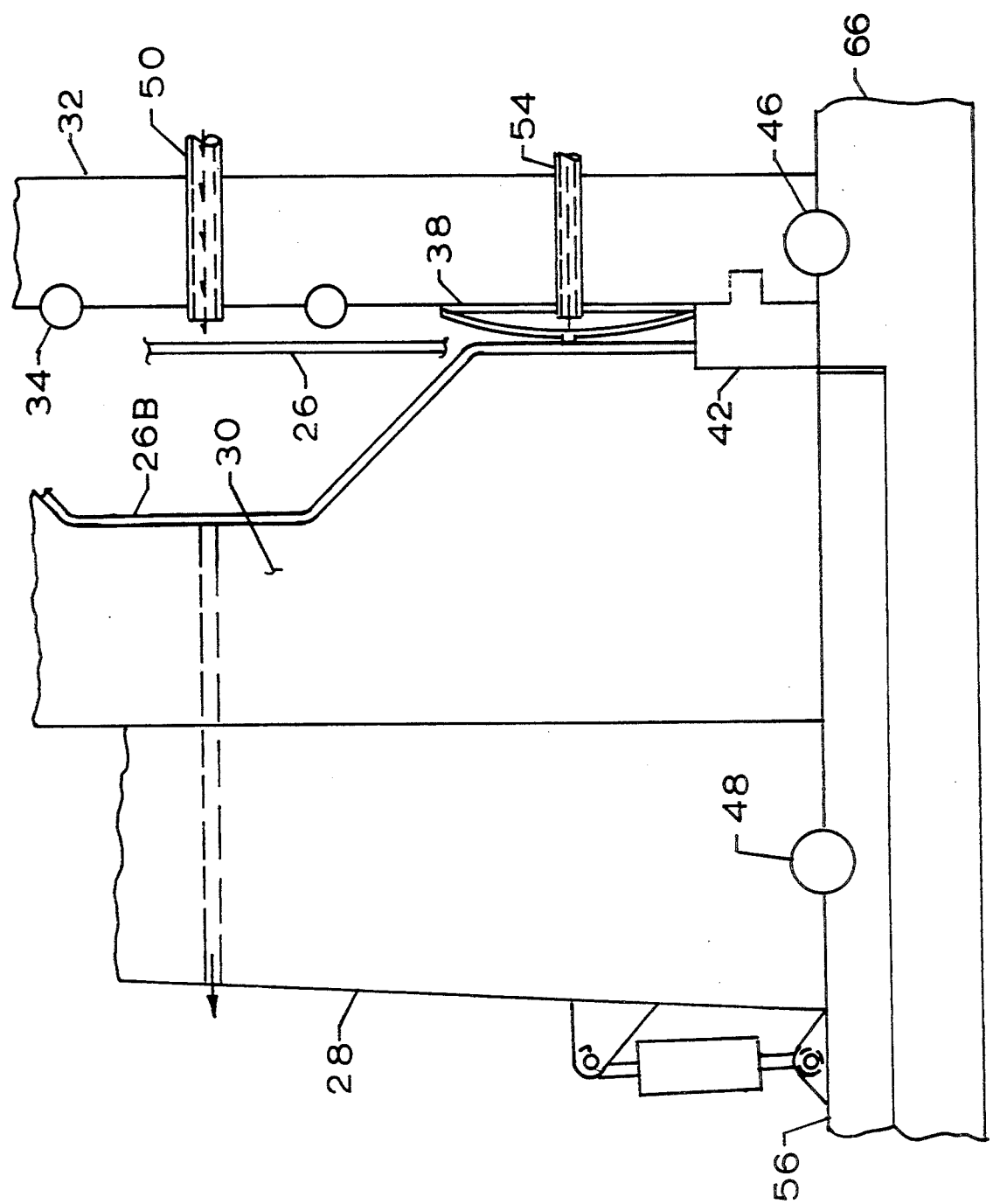

FIG. 10 shows an enlargement of the lower end of the shape 26B and preform 26. It illustrates the case 28 sealed to the base 56 by compressing a seal 48. The heater core holder comprises a seal 46 effecting a seal to the base 56. The inflatable impingement seal 38 is pressurized through the delivery tube 54. A vacuum can then be pulled on the die side. The heaters 34 are activated and forming gas pressure is delivered through the delivery tube 50. The preform will take the shape 26B of the die 30. Since it may be necessary to remove the case 28 and translate the die 30 away from the part 26B a combination seal-part retainer 42 is required. We now have the capability to form, anneal, and harden a part in a clean environment.

Figure 11:
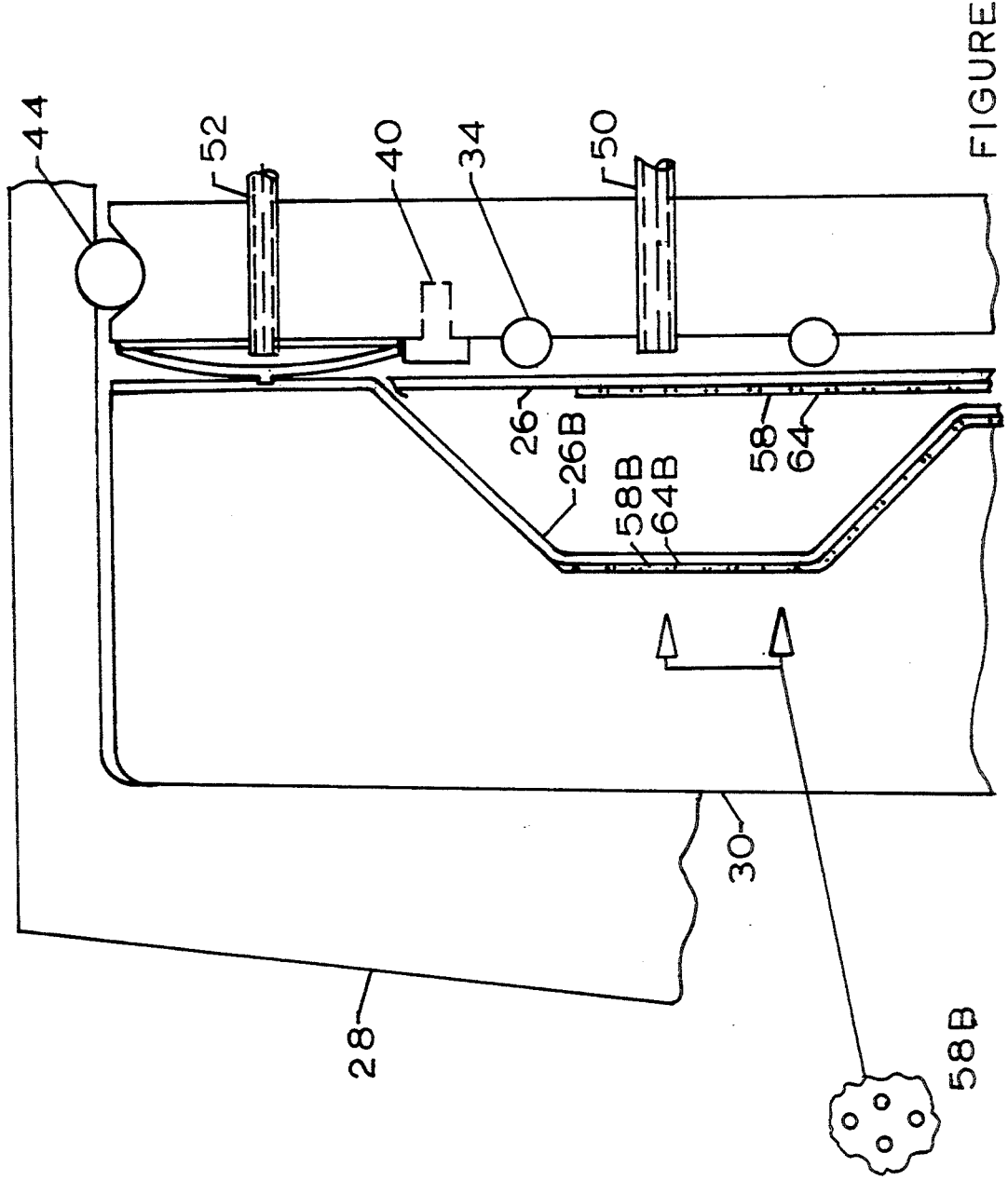

FIG. 11 shows a common part used in the aerospace industry and it is a perforated sheet metal shape 58B used in acoustic applications. Obviously the perforated sheet will not hold gas pressure. The answer lies in using the preform 26 as a slave sheet to cause the perforated detail 58 to take the finished shape 58B of the die 30. The perforated detail 58 does not have to be a 360 degree shape but it does have to be indexed by tack welding or some means to the 360 degree preformed shape. A thermoplastic detail 60 would be formed the same as the perforated detail 58. Everything noted in FIGS. 10 and 11 are the same with the detail 58 and 60 added as indicated.

Figure 12:
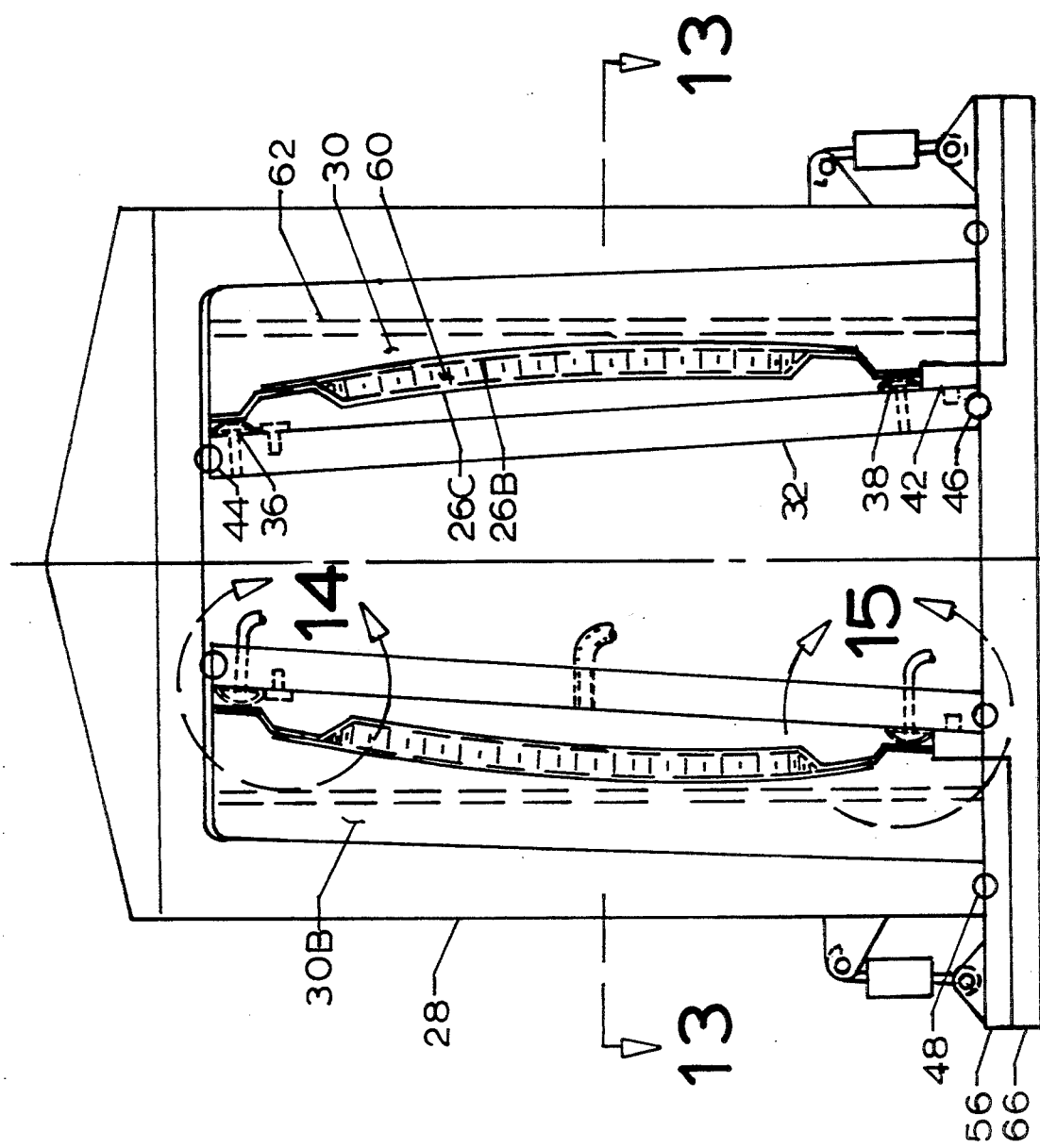
FIGS. 12 through 19 are intended to define the bonding process.

FIG. 12 is a composite view of a typical aerospace sheet metal adhesive bond shape inside the facility. The outer sheet metal shape 26B has been end trimmed to fit against the die-bond tools 30 and 30B. The main body core 60, the upper end dense core 60B and the lower end dense core 60C and adhesives are put into place. The inner sheet metal shape 26C is placed around the multi-purpose holder 32 and against the end seals 36 and 38. The dies 30 and 30b are translated into the closed position and the case 28 is installed. The holder 32 is now sealed to the base 66 with the seal 46 and to the upper part of the case 28 with seal 44. The case 28 is sealed to the base 56 with the seal 48. The inflatable end seals 35 and 38 are inflated. The proper bonding temperature is activated. Bonding pressure is applied to the inner side or heater-holder side of the bond shape. The key to using 26C as a pressure vessel and effecting a bond is the use of a common end surface area used to form 26B and 26C. See FIGS. 14 and 15.

Figure 13:
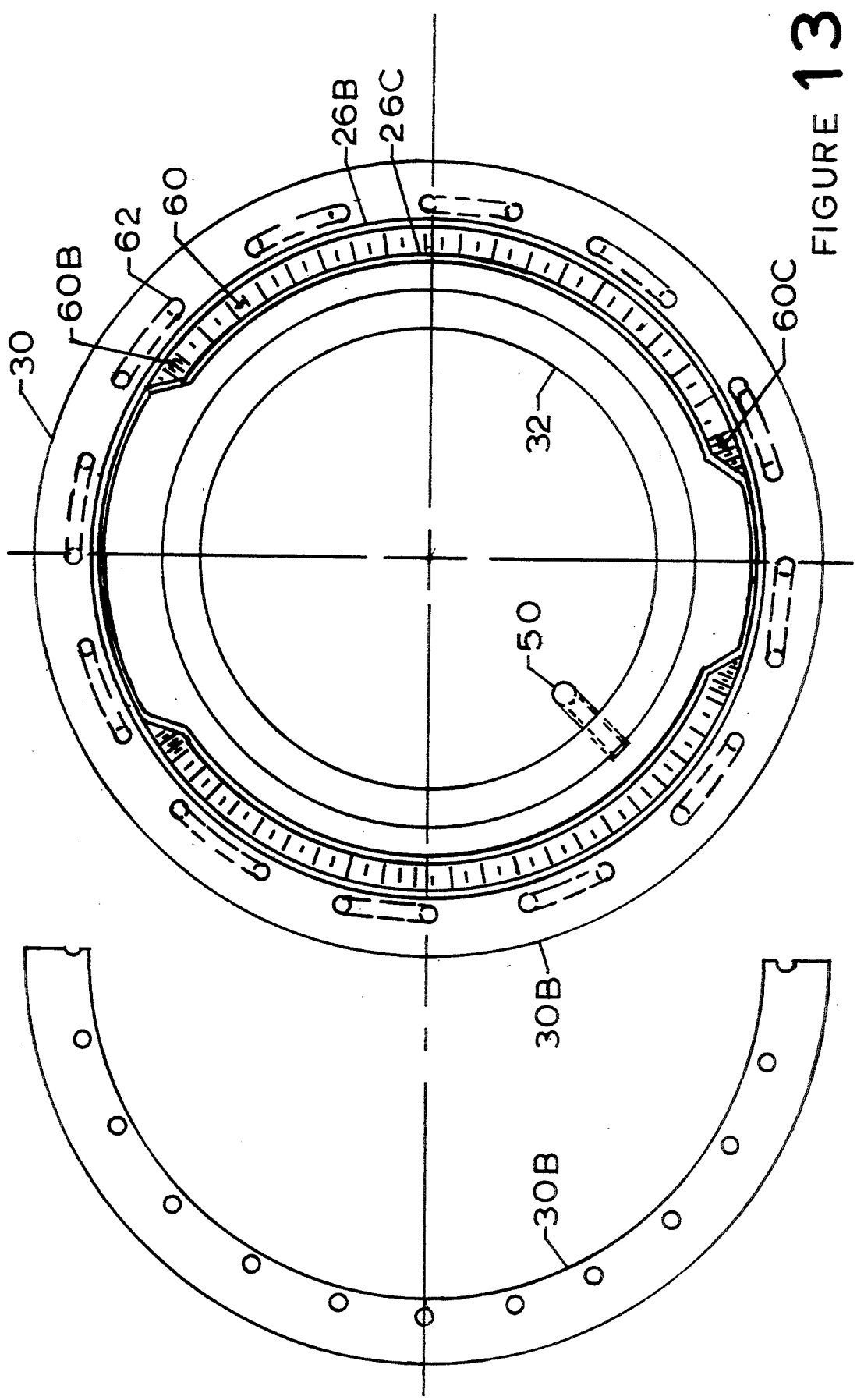

FIG. 13 shows a section cut through the bond shape and the facility. The case 28 has been omitted in order to illustrate that the dies 30 and 30B are translatable. The dies 30 and 30B show heating elements 62. The heating elements insure an even distribution of heat on all sides of the bond shape during curing.

Figure 14:
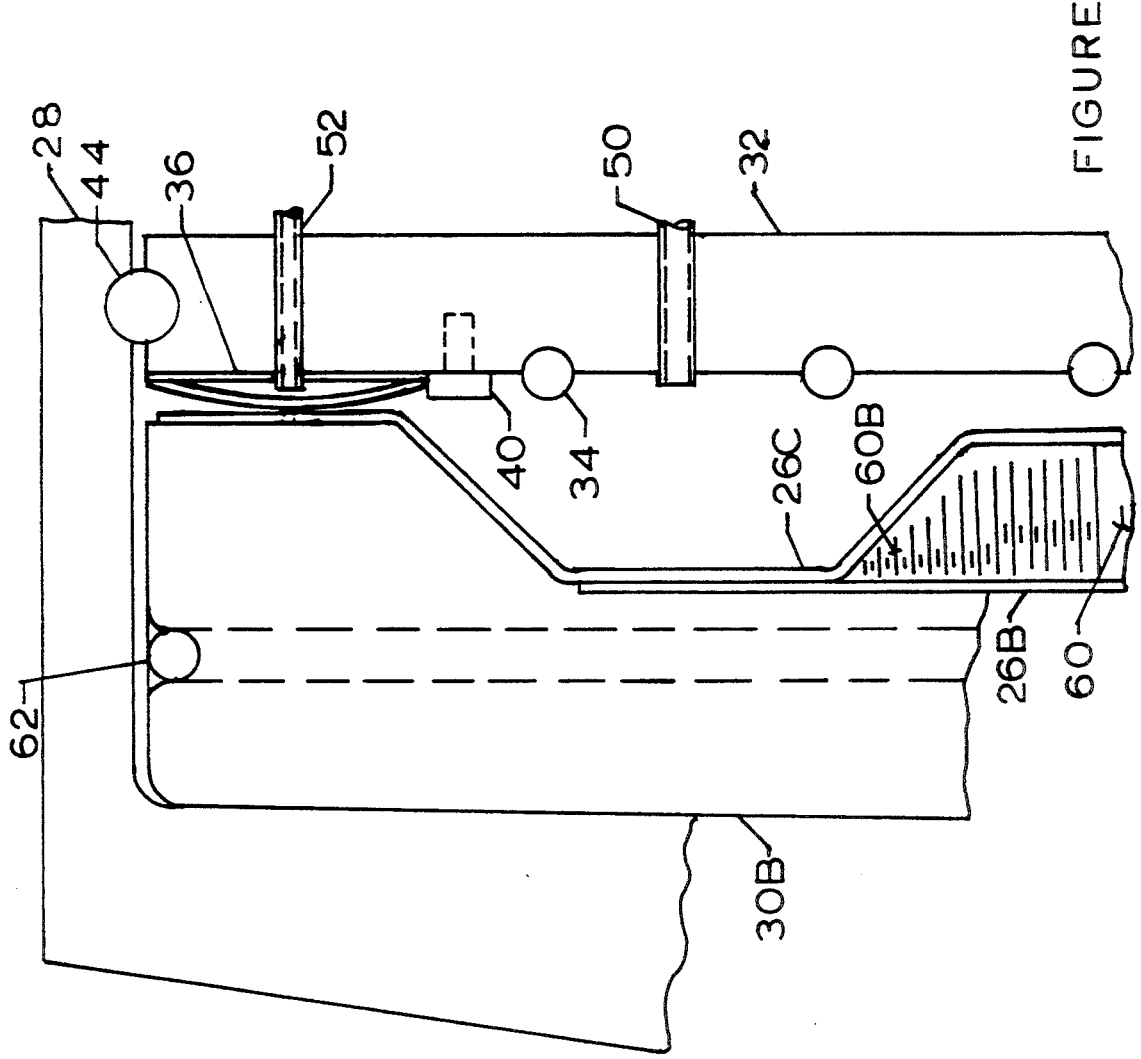

FIG. 14 shows an enlargement of the upper end of the bond shape. It defines the common die surface for 26B and 26C. It illustrates that the case 28 is sealed to the holder 32 by compressing the seal 44. It illustrates that the inflatable impingement seal 36 is pressurized with gas through a delivery tube 52. The impingement seal is retained with step-pins 40. It depicts the dense core 60B and the main body core 60. With the ends sealed, heaters 34 and 62 activated, gas pressure is applied to 26C. After a proper curing time a bond shape is produced.

Figure 15:
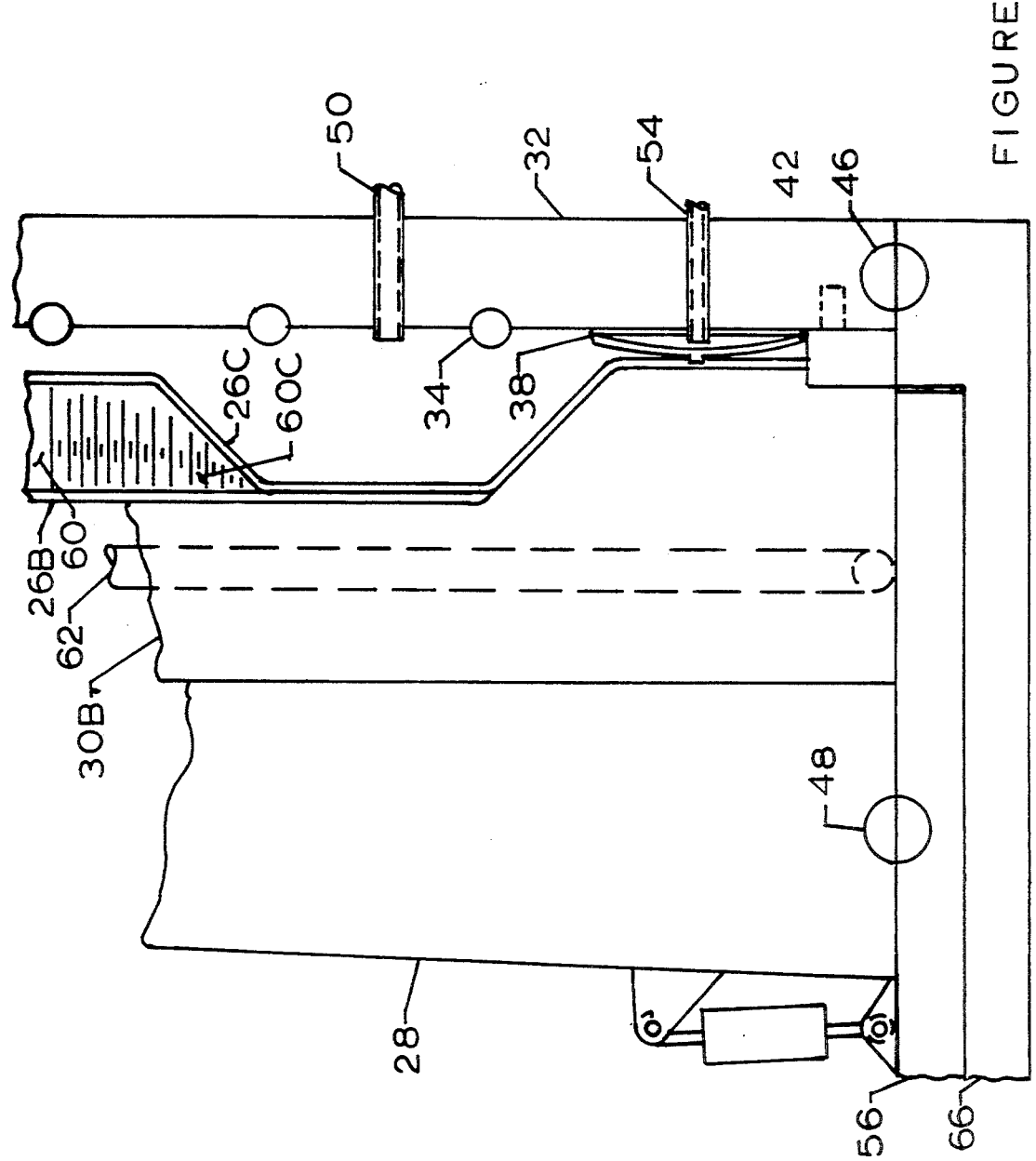

FIG. 15 shows an enlargement of the lower end of the bond shape. It illustrates the case 28 sealed to the base 56 by compressing a seal 48. The multi-purpose holder compresses a seal 46 effecting a seal to the base 66. The inflatable impingement seal 38 is pressurized through the delivery tube 54. The heaters 34 and 62 are activated and appropriate bonding gas pressure is delivered through the delivery tube 50. FIG. 15 depicts the common die surface used to form 26B and 26C prior to bonding. The inner shape 26C uses the common surface of the outer die used to form 26b, during bonding. The seal 42 becomes a combination seal and assembly retainer when the case 28 is removed and the dies 30 and 30B are translated away from the bond shape.

Figure 16:
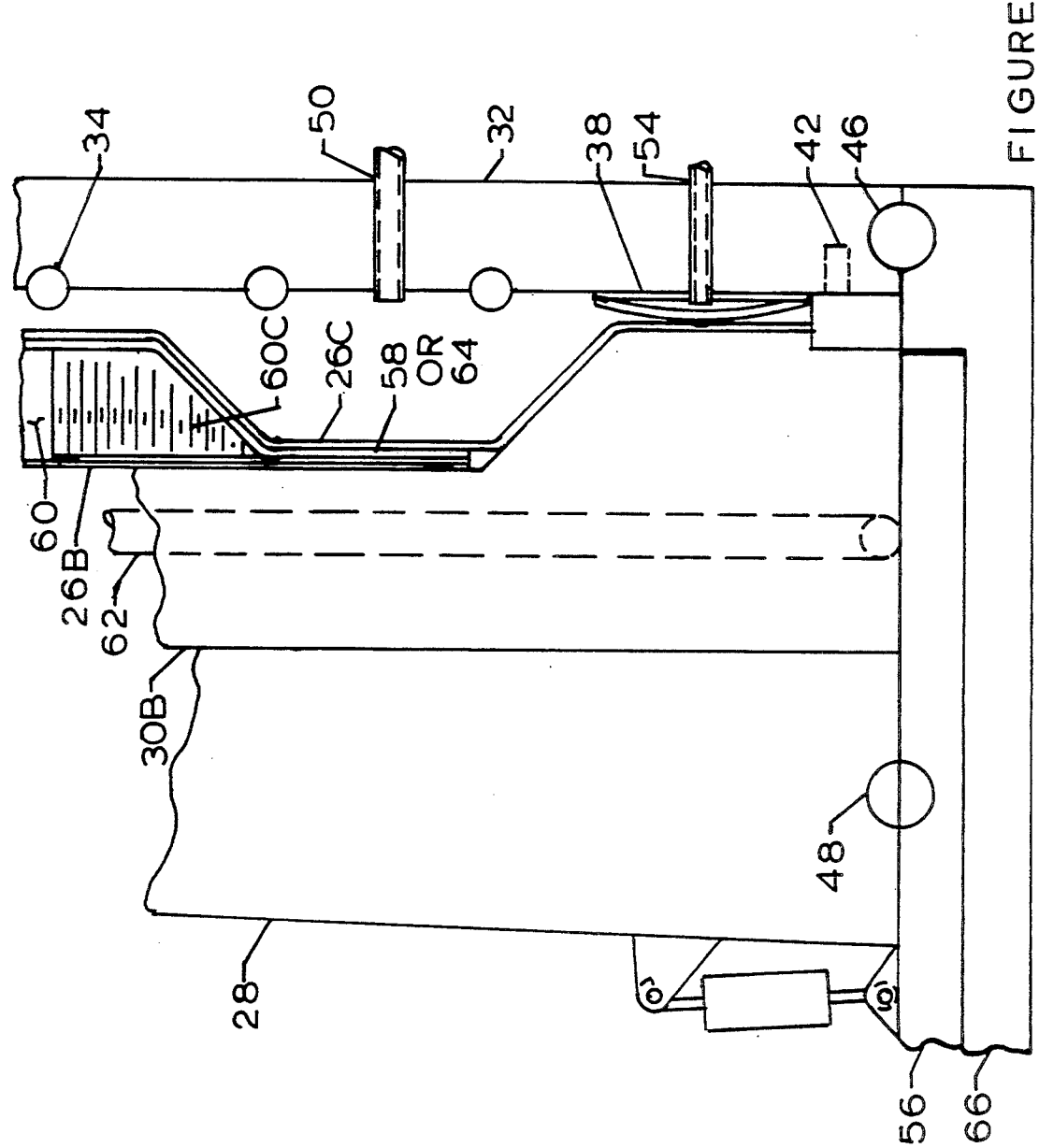

FIG. 16 is the same as FIGS. 15 and 16 except it illustrates the use of 26C as a slave sheet used as a pressure vessel. It shows a perforate detail 58 or a thermoplastic detail 64 being engaged and urged against the core 60, 60B by the pressure vessel 26C.

Figure 17:
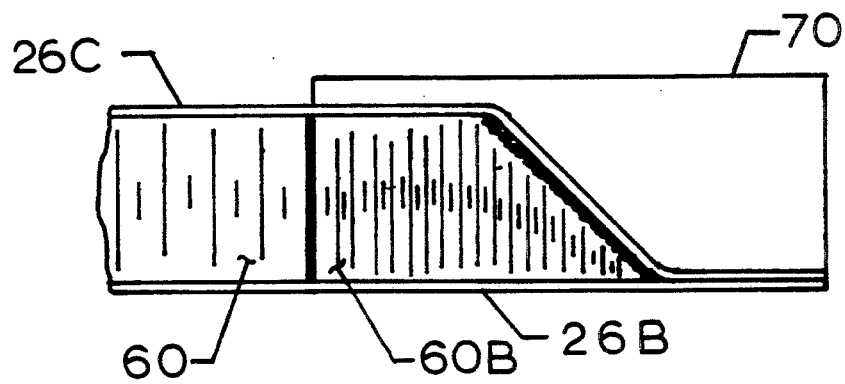
Figure 18:
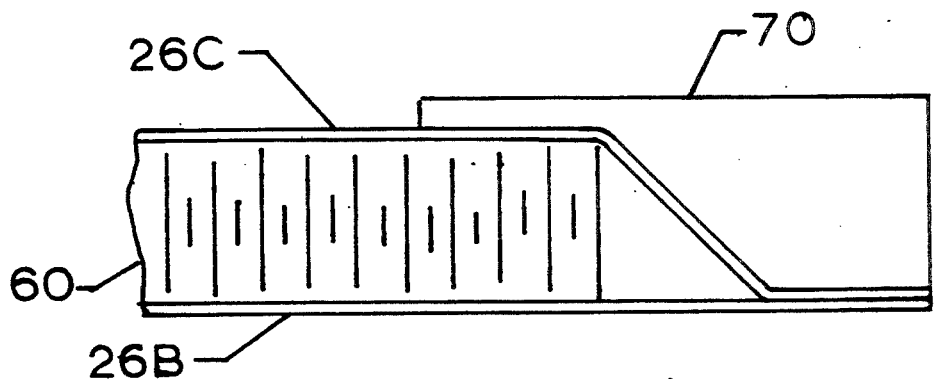
Figure 19:
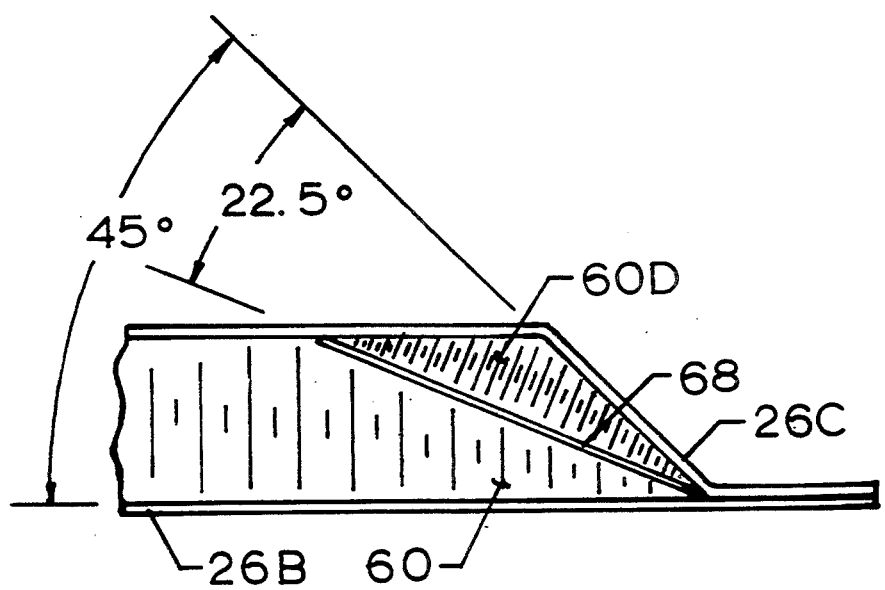

FIGS. 17, 18, and 19 define alternate edge treatments. FIG. 17 depicts a dense core 60B bonded to the field core 60 and to the sheet metal shape with foam adhesive. The caul plate 70 insures that the edge shape is retained. FIG. 18 is a braze bond treatment with no edge core. The sheet metal closure must be protected with a caul plate to avoid cusping FIG. 19 uses dense core cut at a 22.5° angle and a septum plate 68 to distribute the bond pressure load over the field core 60. The septum must be of sufficient thickness to distribute the load.

From the description above, a number of advantages of my out of the autoclave bonding method is evident:
(a) By sealing the case to the base and the multi-purpose holder-we have provided a very clean bonding atmosphere.
(b) 26C is placed very close to the multi-purpose holder. This allows for uniform heating on the inside as the heater coils 34 will span the length of the holder. The bond tools 30 and 30B have been cored and heating elements 62 added. This assures that the bond shape details are surrounded with uniform heat. Specification heat will be selected for bonding. The controller/recorder 20 will direct heat and pressure to the bond shape. This results in the best possible bond assembly.
(c) The nonrecurring cost of bond tooling is eliminated by using the same dies used to form the parts.
(d) Fit up problems are minimized as it is a simple matter to fit details back to the same dies they were formed on.
(e) By curing and cooling under pressure in a 360° system before the bond shape is trimmed, springback is minimized. When non 360° bond panels are cured and removed from their bond tools the ends tend to move inward. This loses dimensional control and makes the hard to install in the next assembly. Dimensional stability is retained with this system.
(f) Acoustic panels that use perforated sheets or thermoplastic details formed with a slave sheet can be bonded using the same slave sheet as the pressure vessel.
(g) The ability to Pull a vacuum on the die side and use argon gas pressure on the heater core side is available if needed.

This facility has been designed to provide several services in a small area. This is the same facility described in the patent application "A METHOD OF HEAT ASSISTED SHEET METAL FORMING IN 360 DEGREE SHAPES". The sheet metal shapes 26B and 26C formed by dies 30 and 30B in that method are used in the following bonded sheet metal shape. The following are the steps necessary to produce a sheet metal adhesive bonded shape:

(a) A multi-purpose holder 32 is installed to the mount ring 24. The holder compresses a seal 46 to effect sealing between the holder and the base.

(b) A shape 26C is lifted with the part handing winch 16 and installed over the order 32.

(c) A shape 26B is trimmed to fit within the dies 30 and 30B. Cores 60, 60B, and 60C and adhesives are fitted to 26B. The dies and noted details are translated to the closed position using the hydraulic dual die positioning base 56 to the mount ring 24. The dies 30 and 30B interface with the untrimmed 26C sheet metal shape, The die used to form the outer skin 26B and the die used to form 26C are different dies but have a common interface at the ends.

(d) A case 28 is then installed over the dies with the case and die winch 18. The case has a tight fit over the dies as it resist all pressures. The case compresses an upper seal 44 to the holder and a lower seal 46 to the base.

(e) Upper 36 and lower 38 impingement seals are inflated with gas pressure to effect a seal to 26C. Heat is activated by the controller 20.

(f) The controller/recorder 20 causes heat to reach the proper bonding temperature and causes gas to be applied to 26C at a controlled rate for bonding and curing a sheet metal adhesive bond shape.

(i) If details were formed using slave sheet 26D, perforated sheet metal and thermoplastic details are examples, the slave sheet becomes the inner pressure vessel all other operations are the same.

(g) After a proper in interval of time of curing at the appropriate temperature and pressure, the temperature is reduced to room temperature while maintaining pressure. When the temperature has been reduced, the pressure is relieved. We now have a sheet metal adhesive bond shape.

(h) All pressures are relieved. The case 28 is removed with the winch 18, The bond dies 30 and 30B are translated to an open position. The bond shape can now be removed with the part winch 16. After removal, assemblies can be trimmed from the sheet metal adhesive bond shape.

(j) The operations noted were for adhesive bonding but are essentially the same for braze bonding.

(k) By following the operations noted above we will end up with low cost bond assemblies with minimal internal stresses that are dimensionally correct.

Accordingly the reader will see that a multitude of materials can be bonded in this facility cost effectively in that Recurring cost of bagging and preparing assemblies for an autoclave is eliminated as the inner sheet metal shape is used as the pressure vessel.

Non-recurring cost of bond dies is eliminated as the sheet metal forming dies are used again as bond tools.

Using forming dies as bond tools insures the best possible fit up during bonding, resulting in the most accurate possible bond assemblies.

Temperature distribution is evenly distributed by a design that surrounds the bond panel.

One, two, or more assemblies can be trimmed from a 360° shape. By heating and cooling under pressure it, a 360° shape before trimming, springback will be minimized.

Acoustic panels, using perforated skins which will not hold pressure, can be bonded using the slave sheet which formed them as the pressure vessel.

Bonded shapes using thermoplastic details formed with a slave sheet can be bonded using the slave sheet which formed them as the pressure vessel.

A vacuum can be pulled on the die side of the shape and argon gas applied on the heater core side of the shape to be bonded if required.

What I claim is:

1. A method for forming sheet metal and thermoplastic adhesive bonding assemblies and brazed bonded assemblies in 360° degree shapes comprising the steps of:
   a) taking a 360 degree multi-purpose holder having a bottom surface and securing said bottom surface to a base;
   b) taking a 360 degree inner skin that has been previously formed from a preform in die assembly A and installing it over said multi-purpose holder;
   c) taking a 360 degree outer skin that has been previously formed from a preform in a die assembly B and trimming its perimeter in a predetermined manner, said outer skin having an outer surface and an inner surface;
   d) taking proper honeycomb core members and applying adhesive to them and to the inner surface of said outer skin and fitting said honeycomb core members to the inner surface of said outer skin;
   e) installing said outer skin over said inner skin into a predetermined position;
   f) closing die assembly B around said outer skin thus allowing die assembly B to become a bonding tool and said inner skin to become a pressure vessel;
   g) installing a case over said dies and securing it to said base;
   h) applying heat and pressure to said inner skin which is in contact with the honeycomb core members laid up on said outer skin to effect an adhesive bonded assembly;
   i) cooling the bonded assembly under pressure to relieve internal stresses; and
   j) trimming the bonded assembly.

2. A method for forming sheet metal and thermoplastic adhesive bonding assemblies and brazed bonded assemblies in 360 degree shapes comprising the steps of:
   a) taking a 360 degree multi-purpose holder having a bottom surface and securing said bottom surface to a base;
   b) taking a 360 degree inner skin that has been previously formed from a preform in die assembly A and installing it over said multi-purpose holder;
   c) taking a 360 degree outer skin that has been previously formed from a preform in a die assembly B and trimming its perimeter in a predetermined manner, said outer skin having an outer surface and an inner surface;
   d) taking proper honeycomb core members and applying brazing material to them and to the inner surface of said outer skin and fitting said honeycomb core members to the inner surface of said outer skin;
   e) installing said outer skin over said inner skin into a predetermined position;
   f) closing die assembly B around said outer skin thus allowing die assembly B to become a bonding tool and said inner skin to become a pressure vessel;

g) installing a case over said dies and securing it to said base;

h) applying heat and pressure to said inner skin which is in contact with the honeycomb core members laid up on said outer skin to effect a brazed bonded assembly;

i) cooling the bonded assembly under pressure to relieve internal stresses; and j) trimming the bonded assembly.

3. A method for forming, sheet metal and thermoplastic adhesive bonding assemblies and brazed bonded assemblies in 360 degree shapes comprising the steps of:

a) taking a 360 degree multi-purpose holder having a bottom surface and securing said bottom surface to a base;

b) taking a preformed sheet previously formed in die A that functions as a slave sheet and installing it over said multipurpose holder, said previously preformed sheet having an outer layer of perforated sheet metal and an inner layer of solid sheet metal;

c) taking a 360 degree outer skin that has been previously formed from a preform in a die assembly B and trimming its perimeter in a predetermined manner, said outer skin having an outer and an inner surface;

d) taking proper honeycomb core members and applying adhesive to them and to the inner surface of said outer skin and fitting said honeycomb core members to the inner surface of said outer skin;

e) installing said outer skin over said preformed sheet of perforated sheet metal into a predetermined position;

f) closing die assembly B around said outer skin thus allowing die assembly B to become a bonding tool and said preformed sheet that functions as a slave sheet to become a pressure vessel;

g) installing a case over said dies and securing it to said base;

h) applying heat and pressure to said inner preformed sheet that functions as a slave sheet which is in contact with the honeycomb core members laid up on said outer skin to effect an adhesive bonded assembly;

i) cooling the bonded assembly under pressure to relieve internal stresses; and j) trimming the bonded assembly.

4. A method for forming sheet metal and thermoplastic adhesive bonding assemblies and brazed bonded assemblies in 360 degree shapes comprising the steps of:

a) taking a 360 degree multi-purpose holder having a bottom surface and securing said bottom surface to a base;

b) taking a preformed sheet previously formed in die A that functions as a slave sheet and installing it over said multipurpose holder, said previously preformed sheet being made of thermoplastic material;

c) taking a 360 degree outer skin that has been previously formed from a preform in a die assembly B and trimming its perimeter in a predetermined manner, said outer skin having an outer and an inner surface;

d) taking proper honeycomb core members and applying adhesive to them and to the inner surface of said outer skin and fitting said honeycomb core members to the inner surface of said outer skin;

e) installing said outer skin over said preformed sheet of thermoplastic material into a predetermined position;

f) closing die assembly B around said outer skin thus allowing die assembly B to become a bonding tool and said preform sheet that functions as a slave sheet to become a pressure vessel;

g) installing a case over said dies and securing it to said base;

h) applying heat and pressure to said inner preformed sheet that functions as a slave sheet which is in contact with the honeycomb core members laid up on said outer skin to effect a adhesive bonded assembly;

i) cooling the bonded assembly under pressure to relieve internal stresses; and j) trimming the bonded assembly.

5. A method for forming sheet metal and thermoplastic adhesive bonding assemblies and brazed bonded assemblies in 360 degree shapes comprising the steps of:

a) taking a 360 degree multi-purpose holder having a bottom surface and securing said bottom surface to a base;

b) taking a preformed metal sheet that functions as a slave sheet and installing it over said multi-purpose holder said previously preformed sheet having an outer layer of perforated sheet metal and an inner layer of solid sheet metal;

c) taking a 360 degree first outer skin that has been previously formed from a preform in a die assembly B and trimming its perimeter in a predetermined manner, said first outer skin having an outer surface and an inner surface;

d) taking proper honeycomb core members and applying brazing material to them and to the inner surface of said outer skin and fitting said honeycomb core members to the inner surface of said outer skin;

e) installing said outer skin over said preformed sheet of thermoplastic material into a predetermined position;

f) closing die assembly B around said outer skin thus allowing die assembly B to become a bonding tool and said preform sheet that functions as a slave sheet to become a pressure vessel;

g) installing a case over said dies and securing it to said base;

h) applying heat and pressure to said preformed sheet that functions as a slave sheet which is in contact with the preform sheet of plastic material that is contact with the honeycomb core members laid up on said outer skin to effect a bronze bonded assembly;

i) cooling the bonded assembly under pressure to relieve internal stresses; and j) trimming the bonded assembly.

* * * * *